US009563527B2

(12) United States Patent
Yamane

(10) Patent No.: US 9,563,527 B2
(45) Date of Patent: *Feb. 7, 2017

(54) TEST SYSTEM

(71) Applicant: ADVANTEST CORPORATION, Tokyo (JP)

(72) Inventor: Tomoyuki Yamane, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 14/295,297

(22) Filed: Jun. 3, 2014

(65) Prior Publication Data

US 2014/0359361 A1  Dec. 4, 2014

(30) Foreign Application Priority Data

Jun. 4, 2013  (JP) ................................. 2013-118142

(51) Int. Cl.
*G06F 11/00*    (2006.01)
*G06F 11/263*   (2006.01)

(52) U.S. Cl.
CPC ................................. *G06F 11/2635* (2013.01)

(58) Field of Classification Search
USPC ......................................................... 714/33
See application file for complete search history.

(56) References Cited

U.S. PATENT DOCUMENTS 4,835,774 A * 5/1989  Ooshima ................ G11C 29/56
                                                    714/719
5,861,882 A * 1/1999  Sprenger ................ G01R 1/025
                                                    700/83
5,996,102 A * 11/1999 Haulin .................... G11C 29/24
                                                    714/32
6,134,689 A * 10/2000 Mateja ............... G01R 31/3181
                                                    714/736

(Continued)

FOREIGN PATENT DOCUMENTS

CN      88103019 A    11/1988
CN      1828325       9/2006

(Continued)

OTHER PUBLICATIONS

Office Action dated Feb. 3, 2015 issued for relating Japanese Patent Application No. 2012-190589 with its English translation from the applicants.

(Continued)

*Primary Examiner* — Amine Riad
(74) *Attorney, Agent, or Firm* — Cantor Colburn LLP

(57) ABSTRACT

A server stores multiple configuration data which respectively provide different functions to a test system. A tester hardware is configured to be capable of changing at least a part of its functions according to the configuration data stored in nonvolatile memory included in the tester hardware. A control program is installed on an information processing apparatus. The control program provides the information processing apparatus with (i) a function of (Continued)

displaying multiple configuration data candidates on a display when the test system is set up, and (ii) a function of writing the configuration data selected by the user to the nonvolatile memory of the tester hardware.

15 Claims, 10 Drawing Sheets

(56) References Cited

U.S. PATENT DOCUMENTS

| | | | | |
|---|---|---|---|---|
| 6,243,832 | B1* | 6/2001 | Eckes | G06F 11/3414 714/33 |
| 6,449,414 | B1* | 9/2002 | Tahara | G02B 3/005 359/652 |
| 6,449,741 | B1* | 9/2002 | Organ | G01R 1/025 714/46 |
| 6,477,672 | B1* | 11/2002 | Satoh | G11C 29/56 714/721 |
| 6,877,118 | B2* | 4/2005 | Oshima | G11C 29/56 365/201 |
| 6,901,534 | B2* | 5/2005 | Carr | G06F 11/2289 713/1 |
| 7,117,415 | B2* | 10/2006 | Forlenza | G01R 31/318371 714/733 |
| 7,526,535 | B2 | 4/2009 | Peck | |
| 7,529,990 | B2* | 5/2009 | Haggerty | G06F 11/2273 714/38.14 |
| 7,627,695 | B2 | 12/2009 | Peck | |
| 8,301,942 | B2* | 10/2012 | Galbraith | G06F 11/1092 714/723 |
| 8,423,841 | B1* | 4/2013 | Lee | G11C 29/12015 365/201 |
| 8,661,293 | B2* | 2/2014 | del Rosario | G06F 11/3688 714/33 |
| 8,868,978 | B2* | 10/2014 | Franceschini | G11C 29/56008 714/33 |
| 9,135,778 | B2* | 9/2015 | Patel | G07F 17/323 |
| 9,250,992 | B1* | 2/2016 | Tam | G06F 11/0787 |
| 2004/0193990 | A1 | 9/2004 | Ichiyoshi | |
| 2004/0210798 | A1* | 10/2004 | Higashi | G01R 31/318307 714/27 |
| 2004/0225465 | A1* | 11/2004 | Pramanick | G01R 31/3183 702/119 |
| 2005/0240454 | A1* | 10/2005 | Hshieh | G06Q 10/063 705/7.11 |
| 2006/0010039 | A1* | 1/2006 | Yang | G06Q 20/203 705/22 |
| 2006/0190206 | A1* | 8/2006 | Huang | G01R 31/2894 702/117 |
| 2006/0271327 | A1* | 11/2006 | Haggerty | G06F 11/2273 702/121 |
| 2007/0022351 | A1 | 1/2007 | Zhou et al. | |
| 2007/0220342 | A1* | 9/2007 | Vieira | G06F 11/3688 714/33 |
| 2007/0276527 | A1* | 11/2007 | Chen | G06Q 10/00 700/96 |
| 2008/0040353 | A1* | 2/2008 | Chang | G05B 19/4188 |
| 2009/0300419 | A1* | 12/2009 | Silverman | G06F 11/27 714/30 |
| 2010/0204949 | A1 | 8/2010 | Chang | |
| 2011/0018572 | A1* | 1/2011 | Chang | G01R 31/31905 324/762.01 |
| 2011/0158103 | A1 | 6/2011 | Hiraide | |
| 2011/0184687 | A1 | 7/2011 | Morita et al. | |
| 2013/0044604 | A1* | 2/2013 | Hatley | H04L 43/10 370/241 |
| 2014/0359361 | A1* | 12/2014 | Yamane | G06F 11/2635 714/33 |
| 2015/0127986 | A1* | 5/2015 | Tahara | G06F 11/263 714/33 |
| 2015/0172164 | A1* | 6/2015 | Chandrasekharapuram | G06F 11/263 714/33 |
| 2015/0186236 | A1* | 7/2015 | Chandrasekharapuram | G06F 11/263 714/33 |
| 2015/0234725 | A1* | 8/2015 | Cillis | H04L 43/50 714/33 |

FOREIGN PATENT DOCUMENTS

| | | |
|---|---|---|
| JP | 60-145634 A | 8/1985 |
| JP | H 09-145788 | 6/1997 |
| JP | H 10-253714 | 9/1998 |
| JP | H 11-064469 | 3/1999 |
| JP | 11-304879 A | 11/1999 |
| JP | 2000-122886 A | 4/2000 |
| JP | 2002-040102 | 2/2002 |
| JP | 2002-208886 | 7/2002 |
| JP | 2003-140895 | 5/2003 |
| JP | 2004-037086 | 2/2004 |
| JP | 2004-37278 | 2/2004 |
| JP | 2004-326426 A | 11/2004 |
| JP | 2005-301370 | 10/2005 |
| JP | 2005-341424 | 12/2005 |
| JP | 2006-003239 A | 1/2006 |
| JP | 2006-162285 A | 6/2006 |
| JP | 2006-242638 | 9/2006 |
| JP | 2007-19992 | 1/2007 |
| JP | 2007-057355 | 3/2007 |
| JP | 2007-528994 | 10/2007 |
| JP | 2008-14784 | 1/2008 |
| JP | 2008-052445 A | 3/2008 |
| JP | 2008-145266 | 6/2008 |
| JP | 2009-198291 | 9/2009 |
| JP | 2010-004139 | 1/2010 |
| JP | 2010-011255 | 7/2010 |
| JP | 2010-177897 | 8/2010 |
| JP | 2010-203937 | 9/2010 |
| JP | 2011-154025 A | 8/2011 |
| JP | 2011-247589 | 12/2011 |
| JP | 2012507769 A | 3/2012 |
| TW | I287639 B | 10/2007 |
| TW | 201030351 | 8/2010 |
| TW | M397528 | 2/2011 |
| TW | 201135258 A | 10/2011 |
| TW | 201140094 | 10/2011 |
| WO | 2004/88339 A1 | 10/2004 |
| WO | 2005/114241 A2 | 12/2005 |
| WO | 2007/132577 | 11/2007 |

OTHER PUBLICATIONS

Office Action dated Mar. 3, 2015 issued for relating Japanese Patent Application No. 2012-127525 with its English translation from the applicants.
IPRP dated Mar. 3, 2015 issued for relating PCT Application No. PCT/JP2013/004383 and its English translation.
Office Action issued on Feb. 9, 2015 for relating U.S. Appl. No. 13/908,876.
Office Action issued for relating Japanese Patent Application No. 2012-127526 issued on Dec. 9, 2014 with its English translation.
IPRP (I) with Written Opinion of ISA dated Dec. 9, 2014 for related PCT Application Nos. PCT/JP2013/003291 with an English translation.
IPRP (I) with Written Opinion of ISA dated Dec. 9, 2014 for related PCT Application Nos. PCT/JP2013/003292 with an English translation.
IPRP (I) with Written Opinion of ISA dated Dec. 9, 2014 for related PCT Application Nos. PCT/JP2013/002527 with an English translation.
IPRP (I) with Written Opinion of ISA dated Dec. 9, 2014 for related PCT Application Nos. PCT/JP2013/002528 with an English translation.
Office Action dated Mar. 24, 2015 issued for Japanese Patent Application No. 2013-118142 and its English translation provided by clients.

(56) References Cited

OTHER PUBLICATIONS

Office Action dated Mar. 24, 2015 issued for related Japanese Patent Application No. 2012-127523 and its English translation provided by clients.
Office Action dated Mar. 24, 2015 issued for related Japanese Patent Application No. 2012-127524 and its English translation provided by clients.
Office Action dated Mar. 24, 2015 issued for related Japanese Patent Application No. 2012-127527 and its English translation provided by clients.
Office Action dated Mar. 24, 2015 issued for related Japanese Patent Application No. 2012-127528 and its English translation provided by clients.
JP Notification of Reasons for Refusal for corres Appln No. JP2013-118142 dated Nov. 4, 2015.
JP Notification of Reasons for Refusal for corres Appln No. JP2012-127528 dated Oct. 27, 2015.
KR Notification of Reasons for Refusal for corres Appln No. KR10-2014-7033344 dated Nov. 19, 2015.
Wataru Izumitani, "[article series] Here is the new wave of semiconductor/IT industry!! Feat of cutting the cost to 1/10 and labor to 1/40 in semiconductor testing—Cloud Testing Service provides leading edge technology on demand!!—", Semiconductor Industry News, Japan [online], Mar. 22, 2013, Sangyo Times Inc., 28th in the series, [retrieved on Oct. 22, 2015], Internet <URL:http://web.archive.org/web/20130327104313/http://sangyo-times.jp/scn/>.
Office action dated Oct. 1, 2014 from related Taiwanese Patent Application Nos. 102119245 and 102119246 and its English summaries provided by the applicant.
International Search Report for PCT/JP2013/003291 mailed on Aug. 27, 2013 and its English translation.
International Search Report for PCT/JP2013/003292 mailed on Aug. 27, 2013 and its English translation.
International Search Report for PCT/JP2013/002527 mailed on Jul. 16, 2013 and its English translation.
International Search Report for PCT/JP2013/002528 mailed on Jul. 16, 2013 and its English translation.
International Search Report for PCT/JP2013/004383 mailed on Oct. 29, 2013 and its English translation.
Office action dated Jul. 22, 2014 from corresponding Japanese Patent Application No. 2012-127525 and its English summary provided by the applicant.
Office action dated Aug. 1, 2014 from corresponding Taiwanese Patent Application No. 102113865 and its English summary provided by the applicant.
Office action dated Aug. 1, 2014 from corresponding Taiwanese Patent Application No. 102113866 and its English summary provided by the applicant.
Chinese Notification of the First Office Action corresponding to Application No. 201380029368.4; Issue Date: Sep. 1, 2016, with English translation.

* cited by examiner

TEST SYSTEM

CROSS-REFERENCE TO RELATED APPLICATIONS

This application claims priority to Japanese Patent Application No. 2013-118142 filed on Jun. 4, 2013, the disclosure of which is hereby incorporated by reference in its entirety.

BACKGROUND OF THE INVENTION

1. Field of the Invention

The present invention relates to a test apparatus.

2. Description of the Related Art

In recent years, various kinds of semiconductor devices are known which are employed in various kinds of electronic devices. Examples of such semiconductor devices include: (i) memory devices such as DRAM (Dynamic Random Access Memory), flash memory, and the like; (ii) processors such as a CPU (Central Processing Unit), an MPU (Micro-Processing Unit), a micro-controller, and the like; and (iii) multifunctional devices such as a digital/analog hybrid device, SoC (System On Chip), and the like. In order to test such semiconductor devices, a semiconductor test apparatus (which will also be referred to simply as "test apparatus") is employed.

The test items for such semiconductor devices can be broadly classified into functional verification tests (which will also be referred to simply as the "functional tests") and DC (Direct Current) tests. With a functional verification test, judgment is made whether or not a DUT (device under test) operates normally according to its design. Examples of such a functional verification test include identification of defect positions, and acquisition of evaluation values which indicate the performance of the DUT. Examples of such a DC test include DUT leak current measurement, operation current (power supply current) measurement, breakdown voltage measurement, and the like.

The functional verification test and the DC test have various kinds of specific content for each of the various kinds of semiconductor devices. For example, in the memory functional verification test, first, a predetermined test pattern is written to the memory. Subsequently, the data thus written to the DUT is read out from the memory, and the data thus read out is compared with an expected value so as to generate pass/fail data which represents the comparison result. Although RAM and flash memory are both memory devices, different test patterns are written to the RAM and the flash memory. Furthermore, there is a difference in the writing/readout data units and the writing/readout sequence between the RAM test and the flash memory test.

In a D/A converter functional verification test, a digital signal is supplied to the input terminal of the D/A converter while sweeping the digital signal value in a predetermined range. With such an arrangement, an analog voltage is output from the D/A converter according to the respective digital values, and the analog voltage values thus output are measured. As a result, the offset voltage or the gain is measured.

On the other hand, in an A/D converter functional verification test, an analog voltage is supplied to the input terminal of the A/D converter while sweeping the analog voltage in a predetermined range. With such an arrangement, digital values are output from the A/D converter according to the respective analog voltage values, and the digital values thus output are measured. As a result, the INL (Integral Nonlinearity) or DNL (Differential Nonlinearity) is measured.

Micro-controllers, digital/analog hybrid devices, SoC, and the like, each include various kinds of built-in components such as RAM, flash memory, a D/A converter, and an A/D converter. Thus, there is a need to perform respective functional verification tests for the built-in components.

Furthermore, in many cases, a boundary scan test is executed for such a semiconductor device.

In the present specification, the test item, test pattern format, test sequence, test condition, and the like, are included in the concept that will be referred to as the "test algorithm".

RELATED ART DOCUMENTS

Patent Documents

[Patent Document 1]
  Japanese Patent Application Laid Open No. 2005-301370
[Patent Document 2]
  Japanese Patent Application Laid Open No. 2003-140895
[Patent Document 3]
  PCT Japanese Translation Patent Publication No. 2007-528994
[Patent Document 4]
  U.S. Pat. No. 7,526,535

With conventional techniques, there are commercially available test apparatuses each designed as a dedicated test apparatus or an optimized test apparatus for each kind of such a semiconductor device, or for each test item. Thus, the user, i.e., the designer or the manufacturer of such a semiconductor device must purchase a test apparatus which supports a particular kind of DUT and particular test items. Furthermore, in order to execute a test item which is not supported as a standard test item by a given test apparatus, the user must purchase an additional hardware component required for the test item, and must mount the additional hardware component on the test apparatus.

In addition, the test apparatus cannot operate on its own. That is to say, there is a need to install a test program on the test apparatus so as to control the test apparatus. With conventional techniques, in order to execute the user's desired test, the user must develop a test program for controlling the test apparatus using a software development support tool, which is a burden on the user.

In particular, in many cases, the format is modified when the generation changes. In some cases, the test algorithm must be changed every time the standard is changed. In other words, the user must personally modify an enormous amount of test programming every time the standard is changed.

Furthermore, conventional test apparatuses are designed mainly for the purpose of testing during mass production. Thus, such conventional test apparatuses have a problem of a large size and a problem of an extremely high cost. This prevents such a test apparatus from effectively being applied to the design phase and the development phase before the mass production phase. Conventionally, in order to test a semiconductor device in the development phase, the user must separately prepare a power supply apparatus, an arbitrary waveform generator, an oscilloscope, a digitizer, and the like, and must combine these components so as to construct a test system of the user's own before the user measures the desired characteristics. For example, let us consider a case in which the user desires to test only a leak current of a processor. Conventional processor test apparatuses each have a function for measuring the leak current. However, it is unrealistic to purchase and employ such a large-size and high-cost test apparatus only for the leak current measurement. Thus, conventionally, the user must construct a measurement system using a power supply apparatus which generates a power supply voltage for a processor, an ammeter which measures a leak current, and a controller which controls the processor to be set to a desired state (vector).

On the other hand, in a case in which the user desires to evaluate an A/D converter, the user must construct a measurement system using a power supply which generates a power supply voltage for the A/D converter, and an arbitrary waveform generator which controls the input voltage to be input to the A/D converter.

Such a test system thus constructed for particular purposes has a problem of poor versatility. Furthermore, such a test system leads to a problem of complicated control operations and a problem of complicated data processing.

It should be noted that the problems described above have been uniquely studied by the present inventors, and are by no means within the scope of common and general knowledge of those skilled in this art.

SUMMARY OF THE INVENTION

The present invention has been made in order to solve such problems. Accordingly, it is an exemplary purpose of an embodiment of the present invention to provide a test apparatus which is capable of solving at least one of the aforementioned problems, and more specifically to provide a test apparatus which is capable of appropriately testing various kinds of devices under test in a simple manner.

An embodiment of the present invention relates to a test system configured to test a device under test. The test system comprises a server, a tester hardware, and an information processing apparatus. The server is configured to store multiple configuration data which allow the test system to have different functions. The tester hardware comprises memory, and is configured to be capable of changing at least a part of its functions according to the configuration data stored in the memory. A control program is installed on the information processing apparatus. The control program provides (i) a function of displaying, on a display, multiple configuration data candidates that can be written to the tester hardware when the test system is set up, and (ii) a function of writing the configuration data selected by the user to the memory of the tester hardware.

The tester hardware has a configuration which is not limited to a particular device or a particular test item. Rather, the tester hardware is designed to have versatility such that it supports various kinds of devices and various kinds of test items. With such an arrangement, the service provider and a third party provide various kinds of configuration data optimized for various kinds of devices under test and various kinds of test content. The configuration data thus prepared is stored in the server.

With such an embodiment, a function of installing the configuration data is implemented in the control program configured as an operating system. Thus, by executing the control program, such an arrangement allows the user to use the GUI to accurately select the user's desired configuration data in an intuitive manner. Furthermore, such an arrangement allows the configuration data thus selected to be written to the memory of the tester hardware, and allows the configuration data stored in the memory of the tester hardware to be rewritten.

In addition, with such an embodiment, there is no need to prepare a dedicated test apparatus (hardware) for each kind of device under test or each test item, thereby providing a reduced cost for the user.

The phrase "displaying, on a display, multiple configuration data candidates that can be written to the tester hardware" includes: displaying configuration data file names; displaying information associated with the configuration data; and the like. For example, in a case in which there is a one-to-one correspondence between the configuration data and the kind of device under test, the information processing apparatus may display a list of kinds of devices under test.

Also, the multiple configuration data may be downloaded beforehand to the information processing apparatus before the control program is executed, i.e., before the setup operation is performed.

Also, the control program may display, as a candidate, the configuration data that has already been downloaded.

Also, the multiple configuration data may be stored in the server as a file that is separate from the control program.

Also, the multiple configuration data may be stored in the server in the form of a single file package.

Also, the multiple configuration data may be included in the control program.

With such an arrangement, the configuration data is hidden from the view of the user. Thus, such an arrangement is capable of protecting the configuration data from being hacked. In addition, such an arrangement allows the user to perform an operation without any concern for the configuration data, thereby providing a user-friendly test system.

Also, the control program may further provide the information processing apparatus with (iii) a function of downloading the configuration data selected by the user from the server.

Also, the server may store multiple program modules in order to provide the test system with different functions, in addition to the multiple configuration data. Also, at least one from among the information processing apparatus and the server may hold license information with respect to whether or not usage by the information processing apparatus is allowed for each of the program modules. Also, when a given program module is executed in a case in which the information processing apparatus has a license to use the program module and the configuration data that corresponds to the program module has been installed on the tester hardware, the information processing apparatus may be able to perform a test operation.

Such an embodiment allows the license management to be performed for each program module. Thus, there is no need to perform the license management for each configuration data, thereby simplifying the use of the system.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

[Overall Configuration of Test System]

Figure 1:
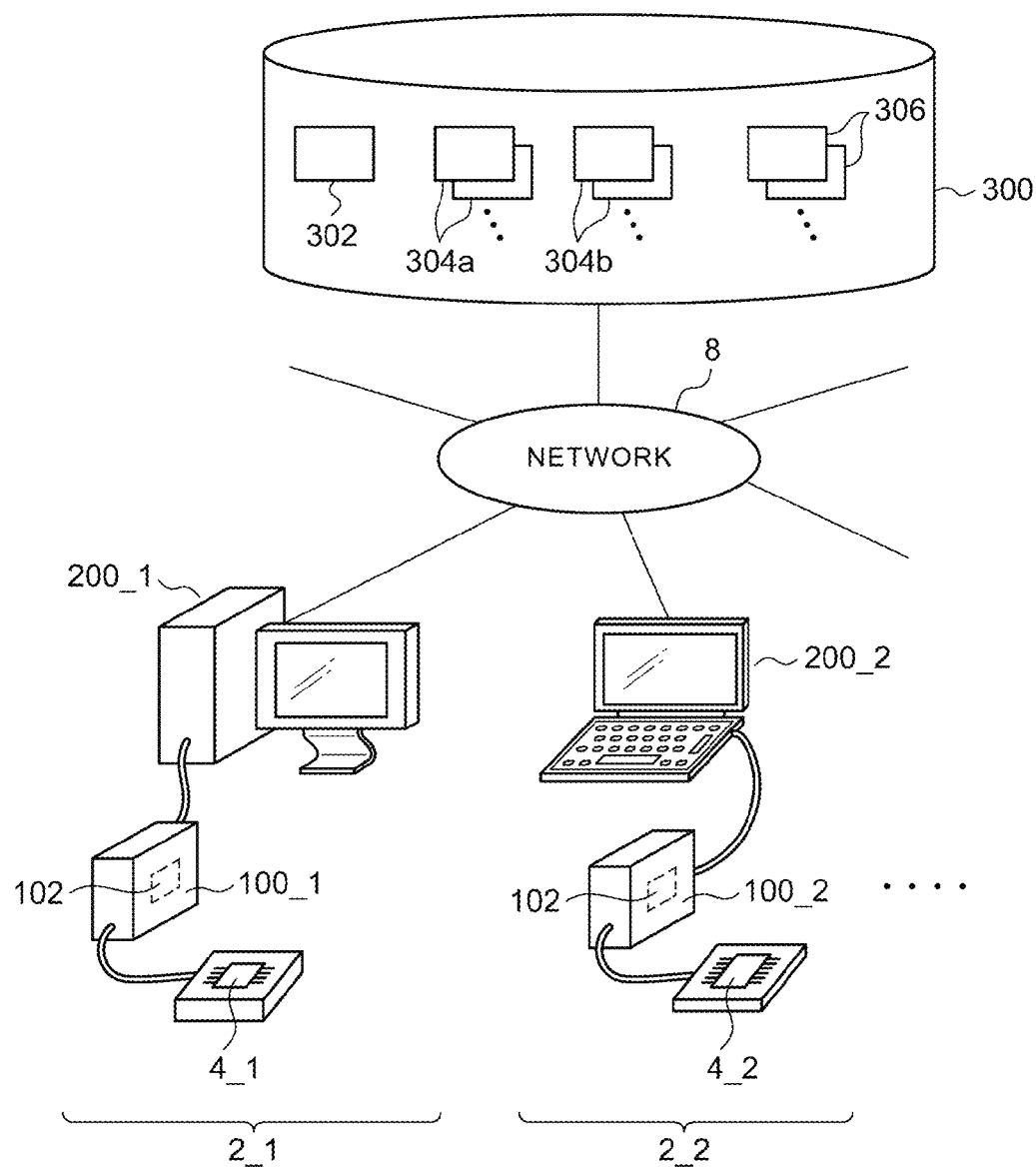
FIG. 1 is a block diagram showing a configuration of a test system according to an embodiment.

FIG. 1 is a block diagram showing a configuration of a test system 2 according to an embodiment. In the present specification, the service to be provided to the test system 2 will also be refereed to as a "cloud testing service". The cloud testing service is provided by the service provider PRV. On the other hand, the user who is to test a DUT 4 using the test system 2 will be referred to as "user USR".

The test system 2 includes a tester hardware 100, an information processing apparatus 200, and a server 300.

The server 300 is managed and operated by the service provider PRV, and is connected to a network 8 such as the Internet. The service provider PRV establishes a website for the cloud testing service on the server 300. Such an arrangement allows the user USR to access the website so as to apply for registration to use the test system 2 and the like.

The server 300 stores a control program 302, a program module 304, configuration data 306, and the like, to be used by the information processing apparatus 200 and the tester hardware 100. Detailed description will be made later regarding the control program 302, the program module 304, and the configuration data 306. Such an arrangement allows the user USR to access the server 300 so as to acquire (download) such software components 302, 304, and 306. Furthermore, such an arrangement allows the user USR to submit an application for a license for the downloaded software component 302 or the like to the service provider PRV via the aforementioned website.

The test system 2 is configured for each information processing apparatus 200. Thus, a tester hardware 100_1, an information processing apparatus 200_1, and the server 300 form a single test system 2_1. Furthermore, a tester hardware 100_2, an information processing apparatus 200_2, and the server 300 form a single test system 2_2. Such an arrangement allows each of the test systems 2_i (i=1, 2, 3, . . . ) to operate independently.

The tester hardware 100 includes rewritable nonvolatile memory (PROM: Programmable ROM) 102, and is configured to allow at least a part of its functions to be changed according to the configuration data 306 stored in the nonvolatile memory 102. In the test operation, the tester hardware 100 supplies the power supply voltage to at least the DUT 4, transmits a signal to the DUT 4, and receives a signal from the DUT 4.

The tester hardware 100 is designed by the service provider PRV, and is provided to the user. The tester hardware 100 is not designed to have a dedicated configuration for a particular kind of semiconductor device or particular test content. Rather, the tester hardware 100 is designed to have high versatility, thereby supporting various kinds of test content.

[Information Processing Apparatus]

Examples of the information processing apparatus 200_i includes a general-purpose desktop PC (Personal Computer), a laptop PC, a tablet PC, and a workstation, and so forth. The minimum functions required for each information processing apparatus 200_i include: (a) a function for connecting to the network 8 so as to access the server 300; (b) a function for executing a test program provided by the service provider; and (c) a function for transmitting/receiving data to/from the tester hardware 100. In many cases, typical commercially available information processing apparatuses each have such functions as their standard functions. Such an information processing apparatus is commercially available at a low cost.

Figure 2:
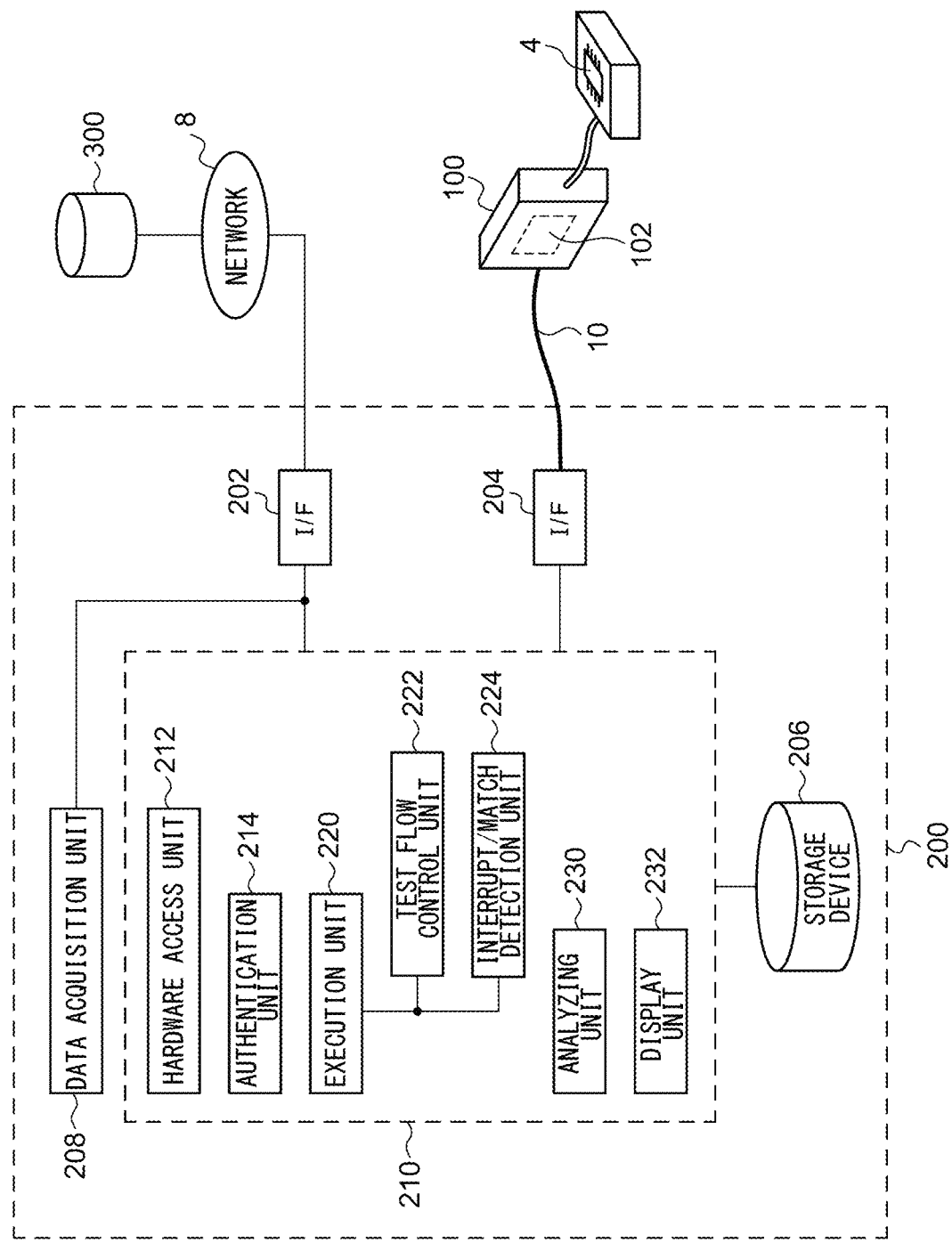
FIG. 2 is a functional block diagram showing an information processing apparatus.

FIG. 2 is a functional block diagram showing the information processing apparatus 200. The information processing apparatus 200 includes a first interface unit 202, a second interface unit 204, a storage device 206, a data acquisition unit 208, and a test control unit 210. It should be noted that each component represented as a functional block which performs various kinds of processing may be realized by means of hardware devices such a CPU, memory, and other LSIs, or otherwise may be realized by means of software components such as a program or the like loaded into memory. Thus, such functional blocks can be realized by hardware components alone, software components alone, or various combinations thereof, which can be readily conceived by those skilled in this art, and the present invention is by no means intended to be restricted to any one of the aforementioned arrangements.

The first interface unit 202 is an interface which transmits/receives data to/from the network 8. Specific examples of the first interface unit 202 include an Ethernet (trademark) adapter, wireless LAN adapter, and the like.

The second interface unit 204 is connected to the tester hardware 100 via a bus 10, and is configured as an interface which transmits/receives data to/from the tester hardware 100. For example, the information processing apparatus 200 and the tester hardware 100 are connected to each other via a USB (Universal Serial Bus) interface.

The data acquisition unit 208 accesses the server 300 via the first interface unit 202, and acquires the control program 302, the program module 304, and the configuration data 306. It should be noted that the device from which the data acquisition unit 208 is to directly receive such data is not restricted to the server 300. Also, the data acquisition unit 208 may acquire such data from a different device after the different device receives such data from the server 300. That is to say, the data acquisition unit 208 may acquire such data secondarily or indirectly from the server 300.

The control program 302, the program module 304, and the configuration data 306 acquired from the outside are stored in a storage device 206.

The test control unit 210 sets up the tester hardware 100, and controls the tester hardware 100. Furthermore, the test control unit 210 processes and analyzes the data obtained as a result of the test of the DUT 4. The CPU included in the information processing apparatus 200 executes the control program 302 provided by the service provider RPV, so as to provide the functions of the test control unit 210.

The test control unit 210 includes a hardware access unit 212, an authentication unit 214, an execution unit 220, a test flow control unit 222, an interrupt/match detection unit 224, an analyzing unit 230, and a display unit 232.

The hardware access unit 212 writes the configuration data 306 to the nonvolatile memory 102 included within the tester hardware 100. Furthermore, the hardware access unit 212 acquires the information with respect to the configuration data 306 written to the nonvolatile memory 102, the version information with respect to the tester hardware 100, and the like.

The authentication unit 214 judges whether or not the user has been licensed beforehand to use the control program 302, the program module 304, and the configuration data 306.

The execution unit 220 executes the test program, and controls the test sequence of the tester hardware 100. The test sequence represents a series of processing operations including: initialization of the tester hardware 100; initialization of the DUT 4; supply of a test pattern to the DUT 4; readout of a signal from the DUT 4; comparison between the signal thus read out and an expected value; and the like. In other words, the test program is configured to allow the tester hardware 100 and the information processing apparatus 200 to execute the test sequence for the test content suitable for the DUT 4. The test flow control unit 222 controls the order of the test items specified in the test program to be executed by the execution unit 220.

A control command for the tester hardware 100 is transmitted to the tester hardware 100 via the second interface unit 204 and the bus 10. The tester hardware 100 operates according to a control command received from the information processing apparatus 200.

When the tester hardware 100 detects an abnormality in the tester hardware 100 such as abnormal temperature, the tester hardware 100 transmits, to the test control unit 210, an interrupt signal which indicates that an abnormality has occurred. In some cases, the test sequence for the DUT 4 includes conditional branching. In some cases, a hardware component included within the tester hardware 100 makes judgment for the conditional branching. For example, in a case in which the DUT 4 is configured as memory, when the tester hardware 100 writes a test pattern having a given data length to the memory, the tester hardware 100 judges whether or not the tester hardware 100 completes the writing of the last data of the test pattern. Also, the tester hardware 100 judges whether flash memory is in the busy state or in the ready state. Such conditional judgment made by the tester hardware 100 will be referred to as "match detection". The tester hardware 100 transmits, to the test control unit 210, a flag which indicates the match detection result.

The interrupt/match detection unit 224 monitors an interrupt signal and a match detection flag. The order of the commands specified in the test program to be executed is controlled according to the monitoring result obtained by the interrupt/match detection unit 224.

The data acquired by the tester hardware 100 is transmitted to the test control unit 210 via the bus 10. The analyzing unit 230 processes and analyzes the data thus received. The display unit 232 provides a GUI (Graphical User Interface) required for the user to control the test program via the display of the information processing apparatus 200, and displays, on the display, the data obtained as a result of the test.

In summary, each information processing apparatus 200_i has the following functions.

(i) Each information processing apparatus 200_i has a function of acquiring the configuration data 306 suitable for the desired test content from the server 300 according to the user input when the test system 2_i is set up, and of writing the configuration data 306 thus acquired to the nonvolatile memory 102 included in the tester hardware 100_i connected to the information processing apparatus 200_i.

(ii) Each information processing apparatus 200_i has a function of executing the test program when the DUT 4 is tested, of controlling the tester hardware 100_i according to the test program, and of processing data acquired by the tester hardware 100_i.

Figure 3:
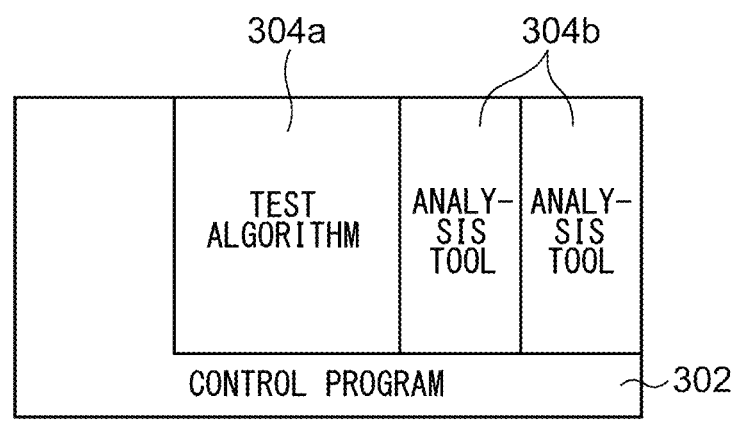
FIG. 3 is a diagram showing a configuration of a test program executed by the information processing apparatus.

FIG. 3 is a diagram showing a configuration of the test program executed by the information processing apparatus 200.

The test program 240 is composed of the control program 302 and the program module 304. The control program 302 is configured as an operating system for the test program 240, and is commonly used regardless of the kind of device under test and the test content. The control program 302 is also referred to as "operating software". The control program 302 provides the functions of the hardware access unit 212, the functions of the authentication unit 214, the functions of the execution unit 220, the functions of the test flow control unit 222, and the functions of the interrupt/match detection unit 224.

On the other hand, the program module 304 can be selectively embedded in the control program 302. The program module 304 can be roughly classified into two modules, i.e., a test algorithm module 304a and an analysis tool module 304b.

The test algorithm module 304a is a program which defines a test algorithm, and specifically the test item, test content, test sequence, test pattern, and the like. Examples of the test algorithm module 304a are listed below according to categories (functions).

(1) DRAM
Function verification program
DC test program (including power supply test program, output voltage test program, output current test program, and the like)
(2) Flash Memory
Function verification program
DC test program
(3) Micro-controller
Function verification program
DC test program
Embedded flash memory evaluation program
(4) a/D Converter and D/a Converter
Contact verification program
Linearity (INL, DNL) verification program
Output voltage offset verification program
Output voltage gain verification program The analysis tool module 304b is a program which defines the evaluation algorithm, and specifically, is a program which defines a method for processing, analyzing, and visualizing the data obtained as a result of the test performed by the tester hardware 100. Examples of the analysis tool module 304*b* will be listed below.

Shmoo plot (two-dimensional characteristics evaluation) tool
    Oscilloscope tool
    logic analyzer tool
    analog waveform observation tool

[Server]

The server 300 stores multiple test algorithm modules 304*a* provided by the service provider PRV. Such an arrangement allows the user to acquire the required analysis tool module 304*b* according to the kind of DUT 4 or the test content, and to embed the analysis tool module 304*b* thus acquired in the test program 240. Thus, with such a test program 240, such an arrangement is capable of selecting and changing the test content to be executed and the kind of data to be acquired by the test system 2 according to the analysis tool module 304 thus embedded.

Furthermore, the server 300 stores multiple analysis tool modules 304*b* provided by the service provider PRV. Such an arrangement allows the user to acquire the required analysis tool module 304*b* according to the kind of DUT 4, the test content, and the evaluation method, and to embed the analysis tool module 304*b* thus acquired in the test program 240. With such a test program 240, such an arrangement is capable of selecting and changing the data processing method and the data analysis method for the data acquired by the test system 2, according to the embedded analysis tool module 304*b*.

Figure 4:
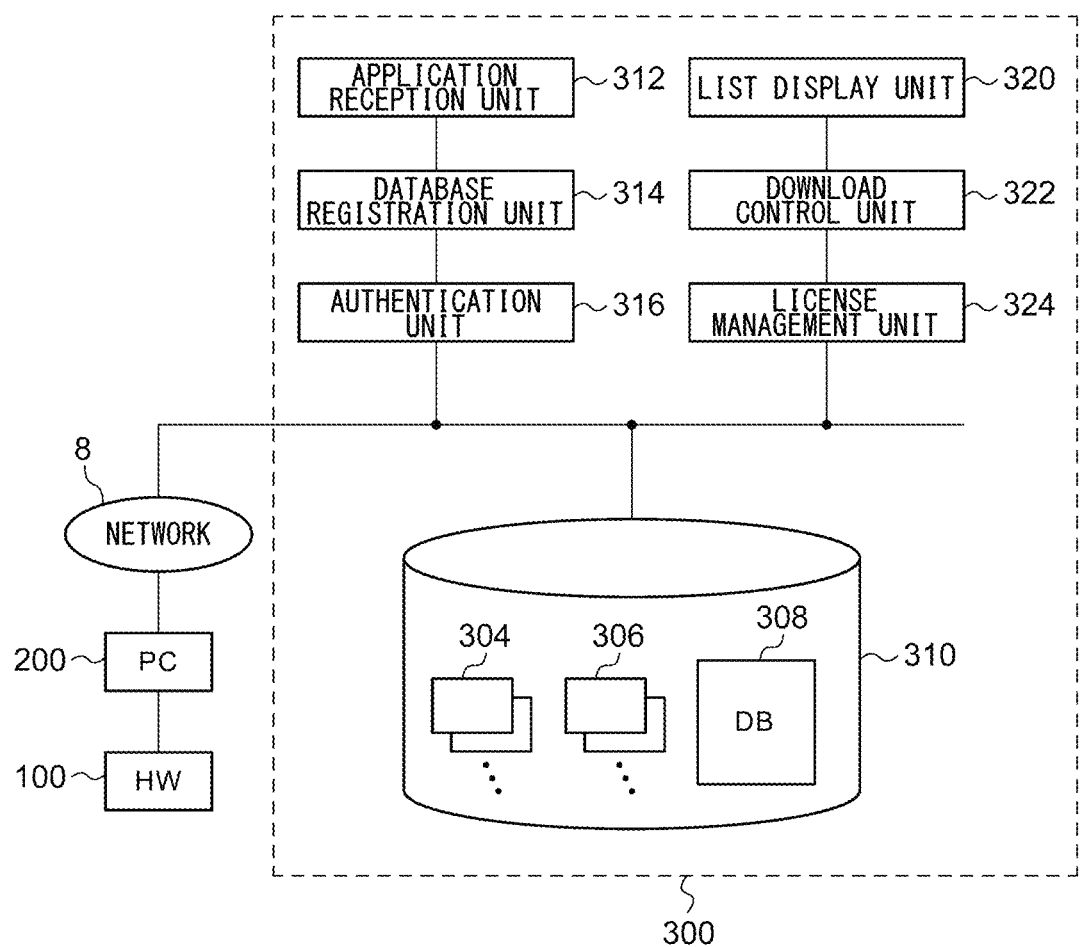
FIG. 4 is a functional block diagram showing a configuration of a server.

FIG. 4 is a functional block diagram showing the configuration of the server 300.

The server 300 includes a storage unit 310, an application reception unit 312, a database registration unit 314, a list display unit 320, a download control unit 322, and a license management unit 324.

The storage unit 310 stores the multiple program modules 304, the multiple configuration data 306, a database 308, and other programs and data.

The application reception unit 312 receives an application to use a cloud testing service from the user USR. After an examination performed by the service provider PRV, the database registration unit 314 registers, in the database 308, the information with respect to the user USR, i.e., the user ID, login password, and the like. Furthermore, the database registration unit 314 registers, in the database 308, the identification information for the information processing apparatus 200 specified by the user USR.

The authentication unit 316 performs the login authentication of the user when the user accesses the server 300. Specifically, the authentication unit 316 prompts the user to input the user ID and the password, and judges whether or not the user ID and the password agree with those registered in the database 308. After the user's successful login authentication, the user is able to download software and data, to apply for a license, and the like.

The download control unit 322 displays the list of the multiple program modules 304 and the multiple configuration data 306 stored in the storage unit 310 as items that can be downloaded by the user.

The download control unit 322 provides the program module 304 or the configuration data 306 to the information processing apparatus 200 in response to a request from the user to download the program module 304 or the configuration data 306.

The license management unit 324 receives an application from the user USR to use various kinds of software and data, and performs processing for license management. Specifically, the license management unit 324 registers the licensed user information described later in the database.

[Tester Hardware]

Figure 5:
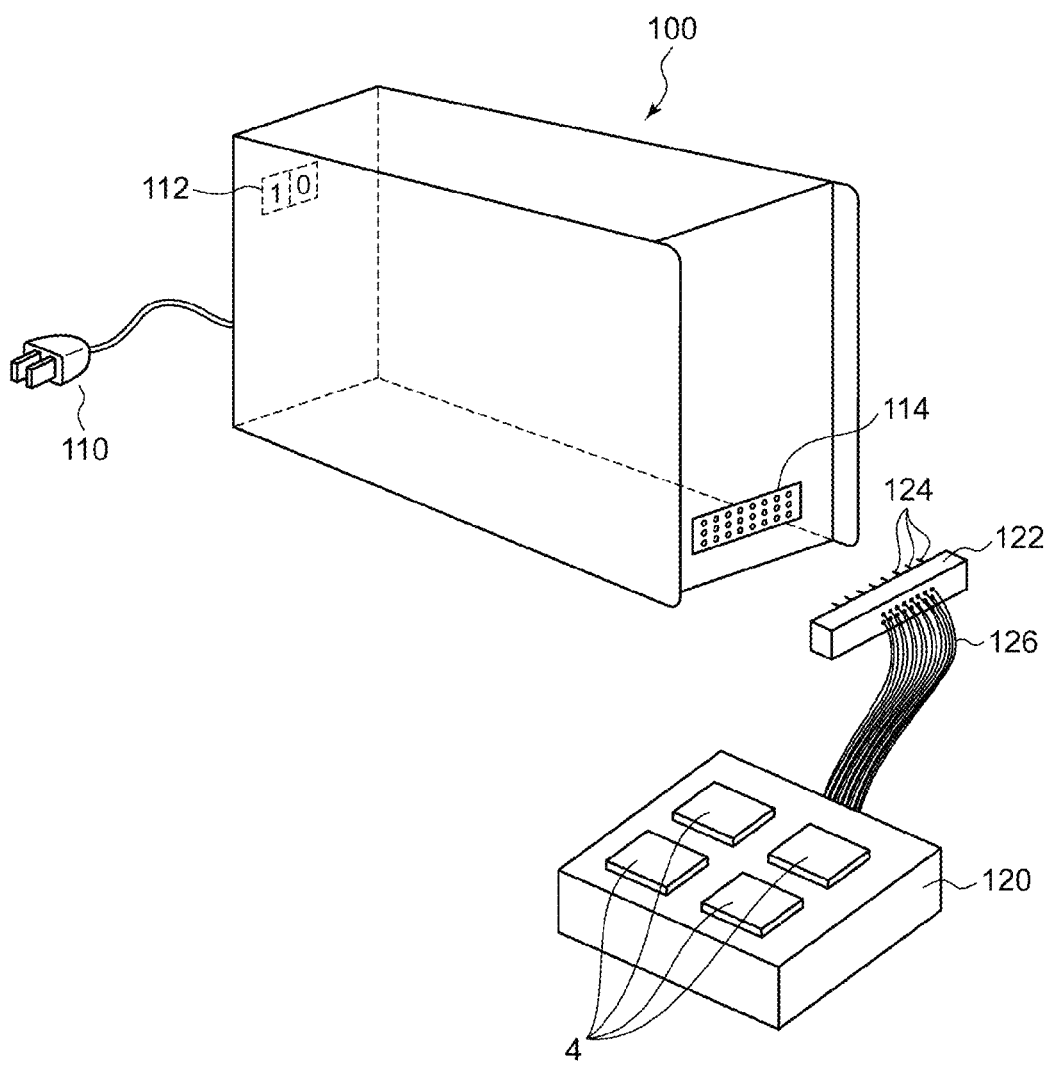
FIG. 5 is an external view of a tester hardware.

Next, description will be made regarding the configuration of the tester hardware 100. FIG. 5 is a diagram showing an external configuration of the tester hardware 100. The tester hardware 100 is configured to have a desktop-sized, portable configuration.

The tester hardware 100 receives electric power from a commercial AC power supply via an AC plug 110. The tester hardware 100 includes, on its back face, a power supply switch 112 for the tester hardware 100.

The DUT 4 is mounted on a socket 120. Multiple device pins of the DUT 4 are respectively connected to multiple pins 124 of a connector 122 via a cable 126. The tester hardware 100 includes, on its front face panel, a connector 114 which allows the connector 122 to be connected to the tester hardware 100. Various kinds of sockets 120 are prepared according to the number of pins and the pin layout of the DUT 4, or otherwise according to the number of DUTs 4 to be measured at the same time.

Figure 6:
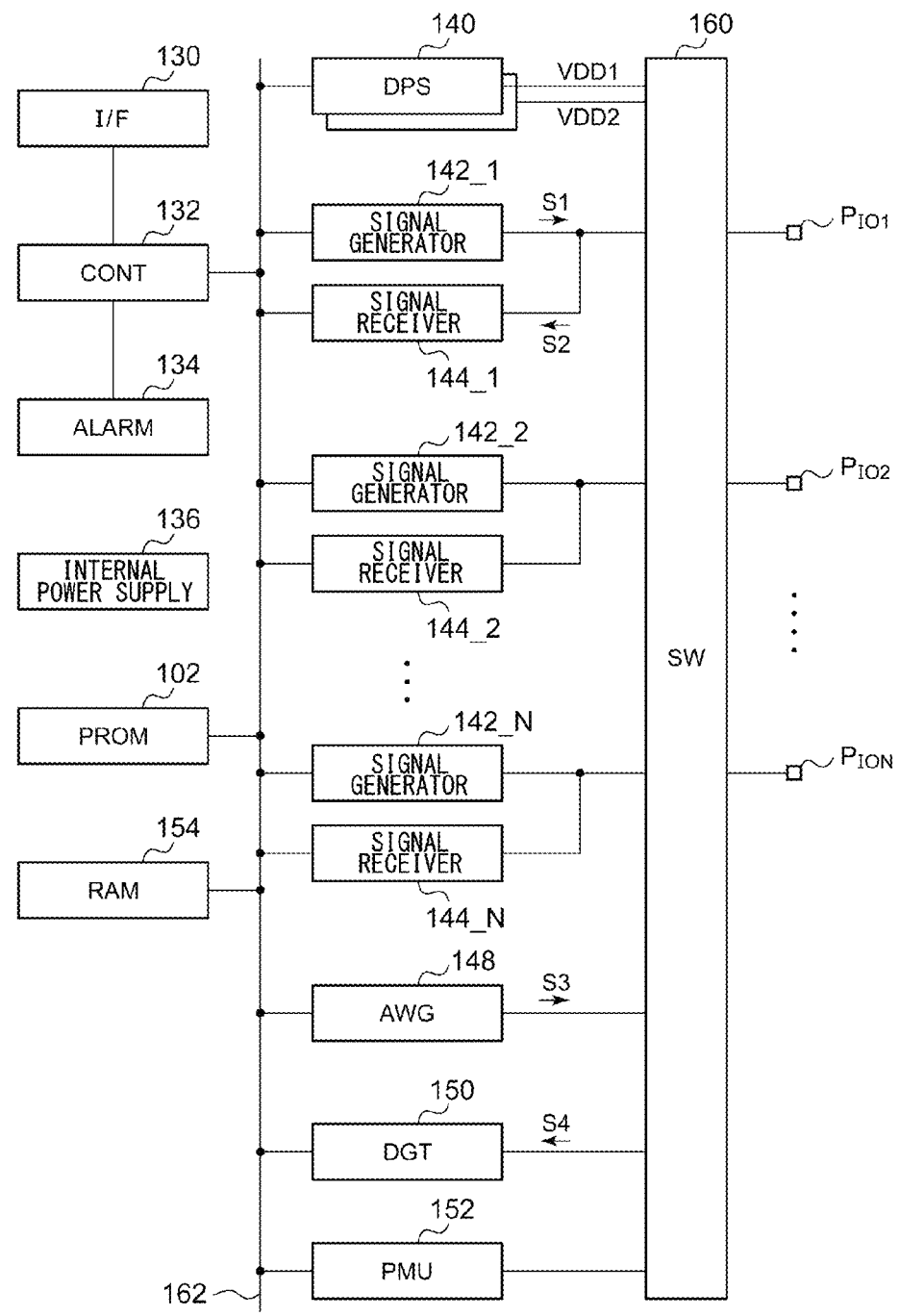
FIG. 6 is a functional block diagram showing a configuration of the tester hardware.

FIG. 6 is a functional block diagram showing a configuration of the tester hardware 100. The tester hardware 100 includes multiple channel tester pins (input/output pins) $P_{IO1}$ through $P_{ION}$, an interface unit 130, a controller 132, an abnormality detection unit 134, an internal power supply 136, a device power supply 140, a signal generator 142, a signal receiver 144, RAM 154, an arbitrary waveform generator 148, a digitizer 150, a parametric measurement unit 152, a relay switch group 160, and an internal bus 162, in addition to the nonvolatile memory 102.

The interface unit 130 is connected to the second interface unit 204 of the information processing apparatus 200 via the bus 10, and is configured to transmit/receive data to/from the information processing apparatus 200. In a case in which the bus 10 is configured as a USB bus, the interface unit 130 is configured as a USB controller.

The controller 132 integrally controls the overall operation of the tester hardware 100. Specifically, the controller 132 controls each block of the tester hardware 100 according to a control command received from the information processing apparatus 200, and transmits data, an interrupt signal, a match signal, and the like, obtained by each block of the tester hardware 100, to the information processing apparatus 200.

The abnormality detection unit 134 detects a hardware abnormality that can occur in the tester hardware 100. For example, the abnormality detection unit 134 monitors the temperature of the tester hardware 100, and generates a temperature abnormality detection signal which is asserted when the temperature exceeds a predetermined threshold value. Also, the abnormality detection unit 134 may monitor the power supply voltage in the tester hardware 100 so as to detect an overvoltage abnormality, a low-voltage abnormality, and the like.

The internal power supply 136 receives an external AC voltage, and rectifies and smooths the external AC voltage thus received, thereby converting the AC voltage into a DC voltage. Subsequently, the internal power supply 136 steps down the DC voltage thus converted, so as to generate a power supply voltage for each block of the tester hardware 100. The internal power supply 136 may be configured including an AC/DC conversion inverter, a switching regulator, a linear regulator, or the like, which steps down the output of the inverter.

The device power supply (DPS) 140 generates a power supply voltage VDD to be supplied to the power supply pin of the DUT 4 connected to the tester hardware 100. In some cases, the DUT 4 configured as an analog/digital hybrid device or the like operates receiving multiple different power supply voltages. Thus, the device power supply 140 may be configured to generate multiple different power supply voltages. With the present embodiment, the device power supply 140 is configured to generate two channels of power supply voltages VDD1 and VDD2.

The tester pins $P_{IO1}$ through $P_{ION}$ of the multiple channels CH1 through CHN are respectively connected to the device pins of the DUT 4.

The signal generators 142_1 through 142_N are respectively provided to the channels CH. Each signal generator 142_i ($1 \le i \le N$) outputs a digital signal S1 to the DUT 4 via the corresponding tester pin $P_{IOi}$. In a case in which the DUT 4 is configured as memory, the digital signal S1 corresponds to a control signal for the DUT, a data signal to be written to the memory configured as the DUT, an address signal, or the like.

The signal receivers 144_1 through 144_N are respectively provided to the channels CH. Each signal receiver 144_i ($1 \le i \le N$) receives a digital signal S2 from the DUT 4 via the corresponding tester pin $P_{IOi}$. The digital signal S2 corresponds to various kinds of signals output from the DUT, or data read out from the memory configured as the DUT. The signal receiver 144 judges the level of the signal S2 thus received. Furthermore, the signal receiver 144 judges whether or not the level of the signal S2 thus received agrees with an expected value, and generates a pass/fail signal which indicates whether the signal level agrees with the expected value (pass) or does not agree with the expected value (fail). In addition, the signal receiver 144 judges whether or not the timing of the signal S2 thus received is normal, and generates a pass/fail signal which indicates the judgment result.

The arbitrary waveform generator 148 can be assigned to a desired channel selected from among the multiple channels CH1 through CHN, and generates an analog arbitrary waveform signal S3, and outputs the signal thus generated via the tester pin $P_{IO}$ thus assigned. The digitizer 150 can be assigned to a desired channel selected from among the multiple channels CH1 through CHN, and converts an analog voltage S4, input to the tester pin $P_{IO}$ thus assigned, into a digital signal.

The parametric measurement unit 152 can be assigned to a desired channel selected from among the multiple channels CH1 through CHN. The parametric measurement unit 152 includes a voltage source, a current source, an ammeter, and a voltmeter. In the voltage application and current measurement mode, the parametric measurement unit 152 applies the voltage generated by the voltage source to the tester pin $P_{IO}$ of the channel thus assigned, and measures the current that flows through the tester pin $P_{IO}$ of the channel. Furthermore, in the current application and voltage measurement mode, the parametric measurement unit 152 supplies a current generated by the current source to the tester pin $P_{IO}$ of the channel thus assigned, and measures the voltage at the tester pin $P_{IO}$ of the channel. The parametric measurement unit 152 allows the voltage and current to be measured at a desired pin.

The RAM 154 is provided in order to store the data to be used by each block of the tester hardware 100 or data generated by each block thereof. For example, the RAM 154 is used as pattern memory which stores a digital signal pattern to be generated by the signal generator 142, as fail memory which stores a pass/fail signal, as waveform memory which stores waveform data which represents the waveform to be generated by the arbitrary waveform generator 148 or waveform data acquired by the digitizer 150.

The relay switch group 160 is connected to the tester pins $P_{IO1}$ through $P_{ION}$, the device power supply 140, the signal generators 142_1 through 142_N, the signal receivers 144_1 through 144_N, the arbitrary waveform generator 148, the digitizer 150, and the parametric measurement unit 152. The relay switch group 160 includes multiple relay switches in the internal configuration thereof, and is configured to assign the device power supply 140, the arbitrary waveform generator 148, the digitizer 150, and the parametric measurement unit 152 to a desired tester pin $P_{IO}$.

The internal bus 162 is provided in order to allow the blocks of the tester hardware 100 to transmit and receive signals between them. The kind of internal bus 162 and the number of bus lines of the internal bus 162 are not restricted in particular.

As described above, the tester hardware 100 includes internal blocks, at least one of which is switchable according to the configuration data 306 stored in the nonvolatile memory 102. Thus, at least one of the internal blocks included in the tester hardware 100 having switchable functions may be configured using a programmable device such as an FPGA (Field Programmable Gate Array) or the like.

The above is the configuration of the tester hardware 100. With such a tester hardware 100, by combining each of the blocks of the tester hardware 100, such an arrangement is capable of testing various kinds of semiconductor devices such as memory, a processor, an A/D converter, a D/A converter, etc., via various techniques. Description will be made below regarding the tests which can be provided by the test system 2 using the tester hardware 100.

1a. Memory Function Verification Test

In the memory function verification test, the device power supply 140, the signal generator 142, and the signal receiver 144 are mainly used. The device power supply 140 generates a power supply voltage to be supplied to the memory.

It should be noted that the power supply voltage may be supplied to the DUT 4 via a dedicated power supply line connected to the power supply pin of the memory without involving the relay switch group 160.

Each signal generator 142 generates a test pattern (address signal and data signal to be written) to be supplied to the memory. Each signal receiver 144 judges the level of the signal S2 read from the memory by comparing the signal level with an expected value, thereby performing pass/fail judgment. In addition, each signal receiver 144 judges whether or not the timing of the signal S2 thus received is normal.

1b. Memory DC Test

In the memory DC test, the device power supply 140 and the parametric measurement unit 152 are mainly used. The device power supply 140 generates a power supply voltage to be supplied to the memory. The device power supply 140 is configured to be capable of measuring the power supply voltage and the power supply current output from the device power supply 140 itself. The parametric measurement unit 152 is assigned to the tester pin $P_{IO}$ that corresponds to a desired pin of the memory, by means of the relay switch group 160. The device power supply 140 measures fluctuation in the power supply current and fluctuation in the power supply voltage. Furthermore, the parametric measurement unit 152 measures the leak current and the like at a desired pin.

Furthermore, by measuring the electric potential at a given tester pin and the current that flows via the given pin, such an arrangement is capable of calculating the impedance, which is the ratio between the electric potential and the current thus measured. Thus, such an arrangement can be used for detection of a contact fault or the like.

2a. Micro-Controller Function Verification Test (i) The function verification test for the memory included within the micro-computer can be performed using the same hardware configuration as in 1a.

(ii) The function verification test for the digital signal processing unit (CPU core) of the micro-controller can be performed using the same hardware configuration as in 1a.

2b. Micro-Controller DC Test

The DC test for the micro-controller can be performed using the same hardware configuration as in 1b.

3a. A/D Converter Function Verification Test

In the A/D converter function verification test, the device power supply 140, the arbitrary waveform generator 148, and at least one signal receiver 144 are mainly used. The arbitrary waveform generator 148 is assigned to the analog input terminal of the A/D converter by means of the relay switch group 160, and generates an analog voltage swept in a predetermined voltage range. At least one of the signal receivers 144 is assigned to a respective digital output terminal of the A/D convertor. Each signal receiver 144 thus assigned receives, from the A/D converter, a corresponding bit of a digital code that corresponds to the level of the analog voltage.

Such an arrangement is capable of evaluating the linearity (INL and DNL) of the A/D converter and the like based on the correlation between the digital code acquired by the signal receiver 144 and the analog voltage generated by the arbitrary waveform generator 148.

3b. A/D Converter DC Test

The DC test for an A/D converter can be performed using the same hardware configuration as in 1b.

4a. D/A Converter Function Verification Test

In the D/A converter function verification test, the device power supply 140, at least one of the signal generators 142, and the digitizer 150 are mainly used. The at least one of the signal generators 142 is respectively assigned to a corresponding digital input terminal of the D/A converter. Each signal generator 142 sweeps the input digital signal to be input to the D/A converter over its full-scale range.

The digitizer 150 is assigned to the analog output terminal of the D/A converter by means of the relay switch group 160, and converts the analog output voltage of the D/A converter into a digital code.

Such an arrangement is capable of evaluating the output voltage offset and the output voltage gain of a D/A converter based on the correlation between the digital code acquired by the digitizer 150 and the digital code generated by the signal generator 142.

4b. DC Test for D/A Converter

The DC test for a D/A converter can be made using the same hardware configuration as in 1b.

Such an A/D converter and a D/A converter may each be configured as a single separate IC, or may each be built into a micro-controller.

5. Oscilloscope Test

By assigning the digitizer 150 to a desired channel by means of the relay switch group 160, and by raising the sampling frequency of the digitizer 150, such an arrangement is capable of acquiring the waveform data of a signal that passes through the channel. By visualizing the waveform data by means of the information processing apparatus 200, such an arrangement allows the test system 2 to function as an oscilloscope.

By means of the tester hardware 100, such an arrangement is capable of executing various kinds of function verification tests and various kinds of DC tests, in addition to those described above for exemplary purpose, which can be easily understood from those skilled in this art.

With a preferable embodiment, the tester hardware 100 is configured to change at least the pattern of the digital signal S1 generated by the signal generator 142 according to the configuration data 306 written to the nonvolatile memory 102. In this case, the nonvolatile memory 102 can be understood as being a part of the signal generator 142.

In this case, by selecting suitable configuration data according to the kind of device before the function verification test is performed for a device under test such as memory, a processor, an A/D converter, a D/A converter, etc., such an arrangement is capable of supplying an optimum digital signal to each device, thereby appropriately testing each device.

More specifically, the signal generator 142 is configured to selectively have a function as (i) an SQPG (Sequential Pattern Generator), (ii) an ALPG (Algorithmic Pattern Generator), and (iii) an SCPG (Scan Pattern Generator) according to the configuration data 306.

The SQPG function and the SCPG function may be provided by a single set of configuration data 306. Such an arrangement allows each signal generator 142 to be switched between the SQPG mode and SCPG mode in a given test. Also, such an arrangement allows a part of the channels of the signal generators 142 to be used as the SQPG while using another part of the channels of the signal generators 142 as the SCPG.

For example, in a case of performing a memory function verification test, by writing the configuration data 306 that corresponds to the ALPG to the nonvolatile memory 102, such an arrangement is capable of automatically generating a very long test pattern by means of calculation.

In a case of performing a function verification test for a processor (CPU or micro-controller) or the like, the configuration data 306 that corresponds to the SQPG function may preferably be written to the nonvolatile memory 102. With such an arrangement, a test pattern defined by the user according to the configuration of the processor or the like may be stored in the RAM 154 beforehand, and each signal generator 142 may read out the test pattern from the RAM 154, and may supply the test pattern thus read out to the DUT 4.

In a case in which the user desires to perform a boundary scan test, by writing the configuration data 306 that corresponds to the SCPG function to the nonvolatile memory 102, such an arrangement provides a test without involving the internal logic of the DUT 4.

The above is the configuration of the test system 2.

Figure 7:
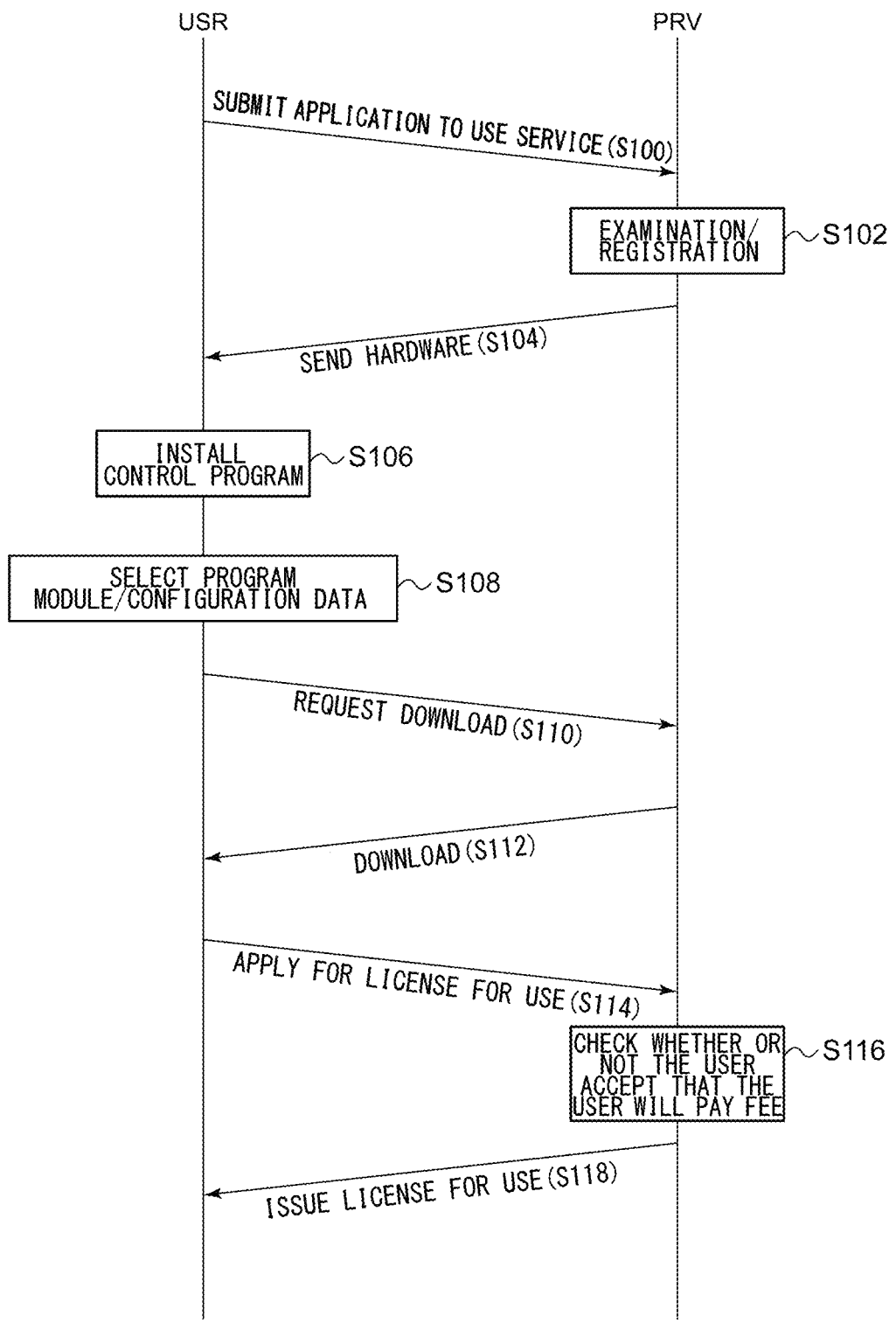
FIG. 7 is a diagram showing the flow of a cloud testing service.

Next, description will be made regarding the flow of the cloud testing service. FIG. 7 is a diagram showing the flow of the cloud testing service.

The user USR submits an application to use the cloud testing service to the service provider PRV (S100). In the application submission, the information with respect to the user USR is transmitted to the server 300 of the service provider PRV.

The service provider PRV performs an examination based on a credit check of the user USR or the like (S102). When the user USR satisfies predetermined conditions in the examination, the user USR is registered in the database as a user of the cloud testing service, and a user ID is assigned to the user USR. In the registration, the user notifies the service provider PRV of the identification information for the information processing apparatus 200 personally used by the user USR as the test system 2. The identification information for the information processing apparatus 200 is also registered in the database of the server 300. The MAC address of the information processing apparatus 200 may be used as the identification information for the information processing apparatus 200.

The service provider PRV sends the tester hardware 100 to the user USR who has been registered (S104). From the viewpoint of the service provider PRV side desiring to widely disseminate the test system 2, and from the viewpoint of the user USR side desiring to construct the test system at a low cost, the service provider PRV and the user USR may conclude a contract whereby the provider PRV lends the tester hardware 100 without compensation. In this case, it is needless to say that the user USR is prohibited from modifying or dismantling the tester hardware 100.

The user USR accesses and logs into the website established by the service provider PRV, downloads the control program 302, and installs the control program 302 thus downloaded on the registered information processing apparatus 200 (S106). It should be noted that the service provider PRV may license only the information processing apparatus 200 that has been registered to use the control program 302. Also, the control program 302 may be distributed in a state in which it is stored on a medium such as a CD-ROM, DVD-ROM, or the like.

After the user USR performs the aforementioned steps, the user USR is able to construct the test system 2 using the tester hardware 100 and the information processing apparatus 200.

Next, the user USR selects the program module 304 and the configuration data 306 suitable for the kind of DUT 4 to be tested and the test content (S108), and requests to download this program module 304 and this configuration data 306 (S110). Upon receiving the request, the server 300 supplies the program module 304 and the configuration data 306 to the information processing apparatus 200 (S112).

Furthermore, the user USR applies to the server 300 of the service provider PRV for approval to use the desired program module 304 and the desired configuration data 306 (S114).

The fee for the program module 304 and/or the fee for the configuration data 306 is/are set according to the duration of use. When the user USR accepts that the user USR will pay the fee (S116), the service provider PRV licenses the user USR to use such a software component for each program module 304 and/or for each configuration data 306 (S118).

Next, description will be made in the following several preferable embodiments regarding the distribution of the program module 304 and the configuration data 306 and regarding the license management.

[First Embodiment]

Figure 8:
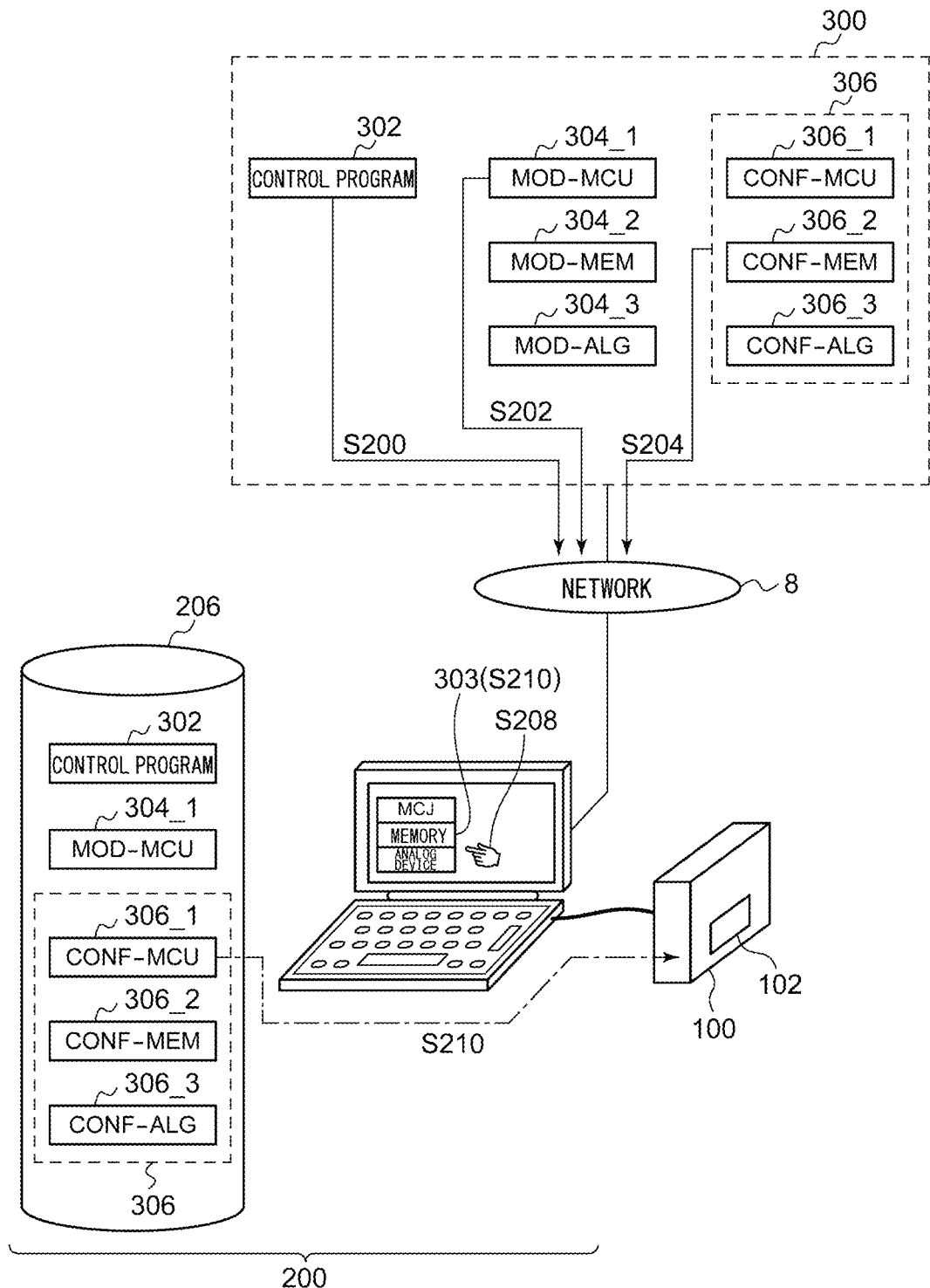
FIG. 8 is a diagram showing the data flow in a test system according to a first embodiment.

FIG. 8 is a diagram showing the data flow in the test system 2 according to the first embodiment.

In the first embodiment, multiple program modules 304_1 through 304_3 and multiple configuration data 306_1 through 306_3 are prepared beforehand, and are stored in the server 300. For example, the program modules 304_1, 304_2, and 304_3 are each configured as plug-in software for the control program 302. Each program module provides the information processing apparatus 200 with a function for testing an MCU (Microcontroller Unit), a memory device, or an analog device. With the present embodiment, the multiple configuration data 306_1 through 306_3 are stored in the server 300 in the form of files separate from the control program 302.

Similarly, the configuration data 306_1, 306_2, and 306_3 each provide the tester hardware 100 with a function for testing an MCU, a memory device, or an analog device.

That is to say, with the present embodiment, the program module 304 and the configuration data 306 are prepared for each kind of DUT. It should be noted that the present invention is not restricted to such an arrangement. For example, even in the same memory device, different program modules 304 or different configuration data 306 may be respectively prepared for flash memory and DRAM. Furthermore, even in the same DRAM, different program modules 304 or different configuration data 306 may be prepared according to the kind of pattern generator.

The control program 302 is previously installed on the information processing apparatus (S200). When the user USR desires to set up the test system 2, the user USR accesses and logs into the website. The list of the program modules 304 that can be downloaded is posted on the website. Next, the user USR downloads the desired program module 304 to the information processing apparatus 200 (S202). FIG. 8 shows a state in which the program module 304_1 suitable for an MCU has been downloaded to the information processing apparatus 200.

The multiple configuration data 306_1 through 306_3 may be stored in the server 300 such that they are packaged into a single file. Before the user USR sets up the test system 2, the user USR downloads a package of the configuration data 306 from the server 300 (S204). The package thus downloaded is stored in a predetermined directory that can be accessed by the control program 302.

Next, description will be made regarding a procedure for installing the configuration data 306 suitable for a test algorithm on the tester hardware 100.

The following functions (i) and (ii) are provided to the information processing apparatus 200 after the control program 302 is installed on the information processing apparatus 200.

(i) A function of displaying, on a display, multiple configuration data candidates 306_1 through 306_3 that can be written to the nonvolatile memory 102 of the tester hardware 100 when the user USR sets up the test system 2.

(ii) A function of writing the configuration data 306_i ($1 \le i \le 3$) selected by the user to the nonvolatile memory 102 of the tester hardware 100.

The control program 302 provides icons, buttons, or menus which allow the user USR to start the install operation for installing the configuration data 306. When the user starts the install operation for the configuration data 306, the control program 302 displays a menu screen 303 on the display of the information processing apparatus 200 shown in FIG. 8 (S206). The control program 302 uses a GUI to display the list of the kinds of DUTs (MCUs, memory, analog devices) that correspond to the multiple program modules 304, for example. The control program 302 may display a particular DUT name as a candidate corresponding to the configuration data 306 that has already been downloaded.

The user operates the information processing apparatus 200 so as to select the kind of DUT to be tested (S208). Let us consider a case in which the user selects an MCU, for example. The control program 302 writes the configuration data 306_1 that corresponds to the MCU thus selected by the user to the nonvolatile memory 102 of the tester hardware 100 (S210).

The above is the procedure for installing the configuration data 306.

With the embodiment, the functions (i) and (ii), which are required to install the configuration data 306, are implemented in the control program 302 configured as an operating system. Thus, by executing the control program 302, such an arrangement allows the user to use the GUI to select the user's desired configuration data in an intuitive manner. Furthermore, such an arrangement allows the configuration data thus selected to be written to the nonvolatile memory of the tester hardware, and allows the configuration data stored in the nonvolatile memory of the tester hardware to be rewritten.

Next, description will be made regarding the license management.

In the present embodiment, the license management is performed for the program modules 304 for each kind of DUT. That is to say, before the user USR desires to construct the test system 2 for testing a given DUT (which will be referred to as the "MCU" hereafter), the user USR concludes a license contract with the service provider PRV for the program module 304 that corresponds to the DUT. A given license allows the user to execute the program module 304 on only the information processing apparatus 200 registered beforehand. It should be noted that such an arrangement may allow the user to download the program module 304 regardless of whether or not the user USR has the license. The user account, the identification information for the information processing apparatus 200, the identifier of the licensed program module 304, and the license period are stored in the database (which will also be referred to as the "licensed user information" hereafter) on the server 300.

In contrast, license management is not performed for the configuration data 306. That is to say, such an arrangement allows the user USR to freely download the configuration data 306. Furthermore, by executing the control program 302, such an arrangement allows the user USR to install the configuration data 306 on the tester hardware 100.

The above is the configuration of the test system 2. Next, description will be made regarding the operation of the test system 2 for managing the license.

The information processing apparatus 200 stores the control program 302 and the program module 304. Furthermore, the configuration data 306 is written to the nonvolatile memory 102 included in the tester hardware 100.

Before the user USR uses the test system 2, the user USR connects the information processing apparatus 200 and the tester hardware 100 to each other via the bus 10. Next, the user USR turns on the power supply for the tester hardware 100, thereby starting up the control program 302 on the information processing apparatus 200.

Furthermore, the user USR starts up one of the program modules 304 which are internal components of the control program 302. After the program module 304 is started up, the control program 302 performs authentication of the program module 304 thus started up.

The authentication unit 214 shown in FIG. 2 accesses the licensed user information stored in the server 300 so as to judge whether or not the user is allowed to use the program module 304 thus executed on the information processing apparatus 200 on which it has been executed. Specifically, the authentication unit 214 judges whether or not the program module 304 thus executed has been registered in the licensed user information, whether or not the identification information for the information processing apparatus 200 has been registered in the licensed user information, and whether or not the time point at which the program has been executed is within the licensed period.

By managing the licensed user information on the server 300 side, such an arrangement is capable of protecting the licensed user information from falsification by the user. In a case in which the licensed user information is provided in a robustly encrypted state, the licensed user information thus encrypted may be stored on the information processing apparatus 200 side. In the license authentication, the licensed user information thus stored on the information processing apparatus 200 side may be used as reference data.

Such an arrangement allows the user to freely install the configuration data 306 regardless of the details of the license contract. Accordingly, it can be assumed that there is a case in which the kind of DUT to be supported by the configuration data 306 stored in the nonvolatile memory 102 is not consistent with the program module 304 to be embedded in the test program 240. In order to solve such a problem, the control program 302 preferably provides the information processing apparatus 200 with a function of checking the consistency between the program module 304 and the configuration data 306.

For example, in a case in which the configuration data 306_1 for memory has been installed when the program module 304_1 for the MCU is executed, the control program 302 notifies the user to the effect that there is an inconsistency between the control program 302 and the configuration data 306. This ensures that the test is performed using a proper combination of the program module 304 and the configuration data 306.

Let us consider a case in which the user has concluded a license contract to use the program module 304_1 for the MCU.

In this case, the configuration data 306_1 is installed in the nonvolatile memory 102 of the tester hardware 100. When the program module for the MCU is executed on the information processing apparatus 200, the MCU is tested.

When the program module 304_1 for the MCU is executed on the information processing apparatus 200 after the configuration data 306_2 for memory has been installed in the nonvolatile memory 102 of the tester hardware 100, the user is shown a notice to the effect that there is an inconsistency between the program module 304 and the configuration data 306. In this case, the control program 302 may prompt the user to rewrite the configuration data with the configuration data 306_1 for the MCU.

Let us consider a case in which the program module 304_2 is executed on the information processing apparatus 200 after the configuration data 306_2 for memory has been installed in the nonvolatile memory 102 of the tester hardware 100. In this case, the user has not concluded a license contract for the program module 304_2. In this case, the user is not allowed to test the memory.

[Second Embodiment]

With the second embodiment, the control program 302 includes multiple configuration data 306_1 through 306_3. That is to say, the control program 302 and the configuration data 306 are handled as a single program. Such an arrangement hides the configuration data 306 from the view of the user USR.

Figure 9:
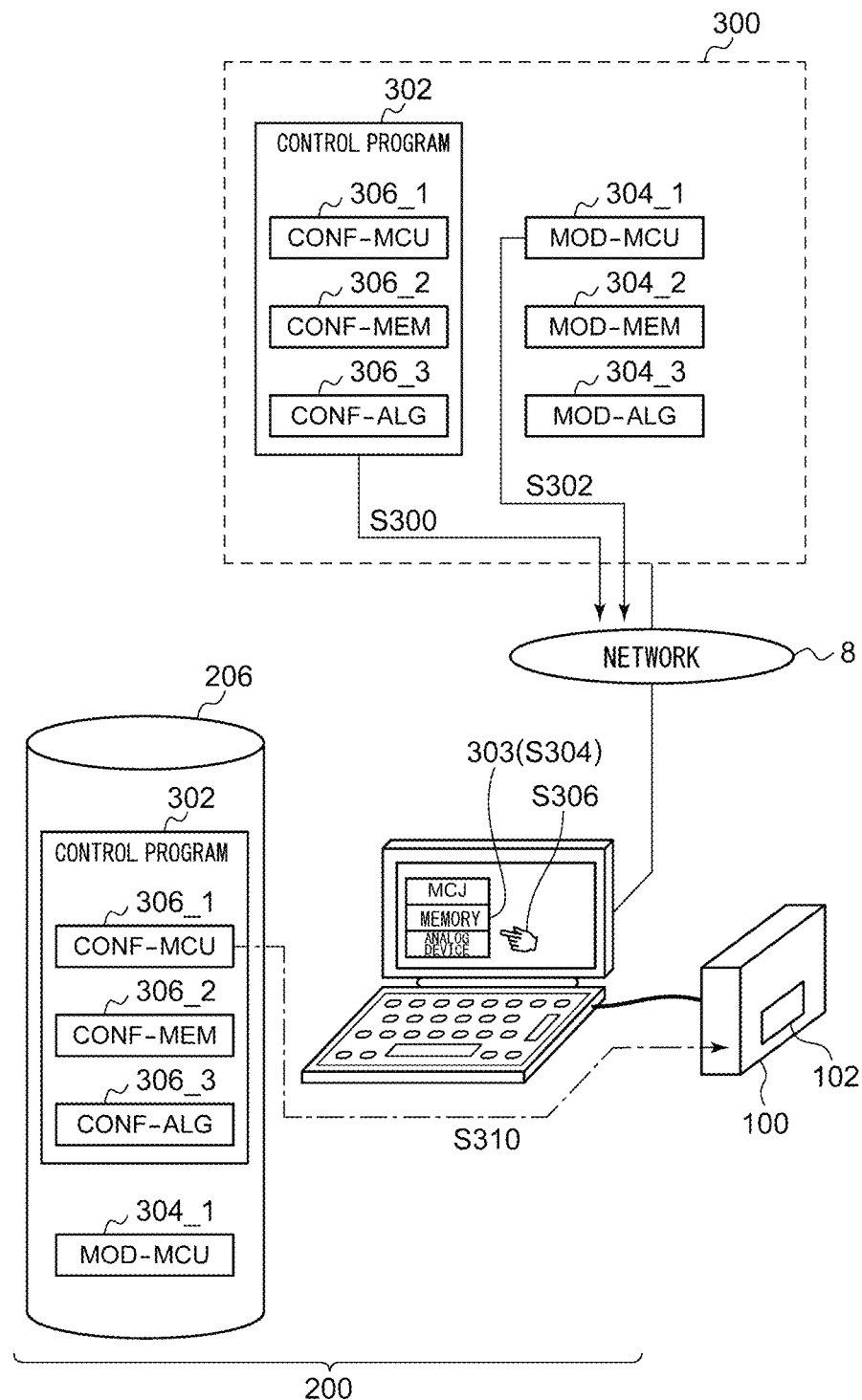
FIG. 9 is a diagram showing the data flow in a test system according to a second embodiment.

FIG. 9 is a diagram showing the data flow in the test system 2 according to the second embodiment. In the step in which the control program 302 is downloaded, the configuration data 306 is also downloaded (S300). The user downloads the desired program module 304 to the information processing apparatus 200 (S302). FIG. 9 shows a state in which the program module 304_1 for the MCU is downloaded to the information processing apparatus 200.

The control program 302 displays the list 303 of the configuration data 306 which can be used, in response to the user's instruction (S304). The user selects the kind of DUT to be tested (S306). Let us consider a case in which the user selects the MCU, for example. The control program 302 writes, to the nonvolatile memory 102 of the tester hardware 100, the configuration data 306_1 that corresponds to the MCU thus selected by the user (S310).

With the second embodiment, the configuration data is hidden from the view of the user. Thus, such an arrangement is capable of protecting the configuration data 306 from being analyzed or hacked by malicious users. In addition, such an arrangement allows well-intentioned users to construct the test system without any concern for the configuration data, thereby providing a user-friendly test system.

[Third Embodiment]

Description has been made in the first and second embodiments regarding an arrangement in which the user personally downloads the configuration data 306. With such embodiments, this leads an increase in the kinds of configuration data 306. In a case in which this leads to an increase in an amount of data, this puts pressure on the storage medium space included in the information processing apparatus 200. In order to solve such a problem, with the third embodiment, the control program 302 provides a download function for downloading the configuration data 306. Such an arrangement allows only the necessary configuration data 306 to be downloaded to the information processing apparatus 200.

With the third embodiment, the multiple configuration data 306_1 through 306_3 are stored in the server 300 in the form of separate files.

Figure 10:
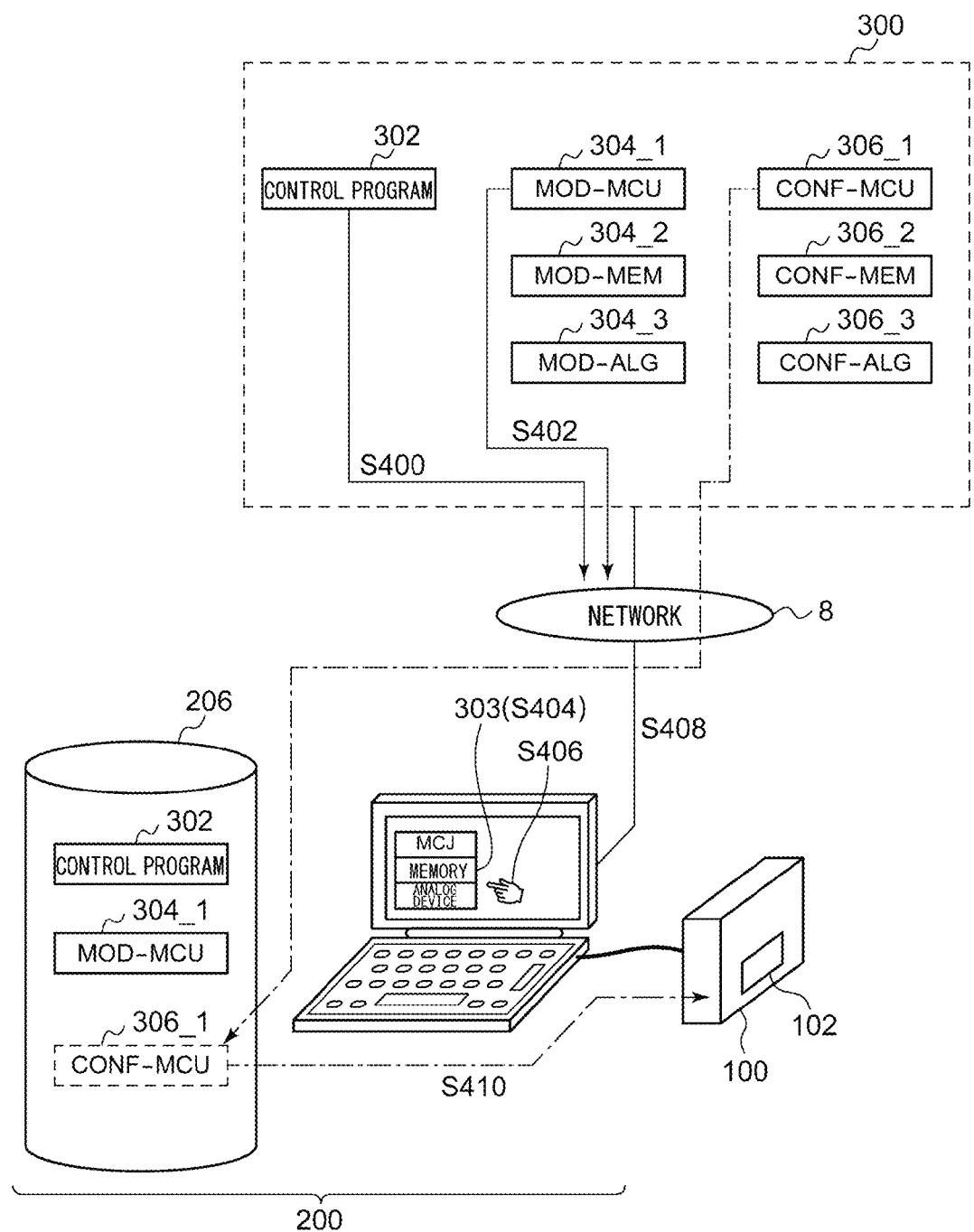
FIG. 10 is a diagram showing the data flow in a test system according to a third embodiment.

FIG. 10 is a diagram showing the data flow in the test system 2 according to the third embodiment.

The control program 302 is previously installed on the information processing apparatus 200 (S400). The user USR downloads the desired program module 304 to the information processing apparatus 200 (S402). FIG. 10 shows a state in which the program module 304_1 for the MCU has been downloaded to the information processing apparatus 200.

The following functions (i) through (iii) are provided to the information processing apparatus 200 after the control program 302 is installed on the information processing apparatus 200.

(i) A function of displaying, on a display, multiple configuration data candidates 306_1 through 306_3 that can be written to the nonvolatile memory 102 of the tester hardware 100 when the user USR sets up the test system 2.

(iii) A function of downloading the configuration data 306_i (1≤i≤3) selected by the user from the server.

(ii) A function of writing the configuration data 306_i (1≤i≤3) thus downloaded to the nonvolatile memory 102 of the tester hardware 100.

The control program 302 provides icons, buttons, or menus which allow the user USR to start the install operation for installing the configuration data 306. When the user starts the install operation for the configuration data 306, the control program 302 displays a menu screen 303 on the display of the information processing apparatus 200 shown in FIG. 8 (S404). The control program 302 uses a GUI to display the list of the kinds of DUTs (MCUs, memory, analog devices) that correspond to the multiple program modules 304, for example.

The user operates the information processing apparatus 200 so as to select the kind of the DUT to be tested (S406). Let us consider a case in which the user selects the MCU, for example. If the storage device 206 does not have the configuration data 306_1 that corresponds to the MCU thus selected by the user, the control program 302 downloads the configuration data 306_1 from the server 300 (S408). Subsequently, the control program 302 writes the configuration data 306_1 thus downloaded to the nonvolatile memory 102 of the tester hardware 100 (S410). The configuration data 306 thus downloaded as temporary data is continuously maintained in the storage device 206.

The third embodiment has an advantage of economical use of the capacity of the storage device 206.

In addition, the third embodiment has the following advantage in managing the version of the configuration data 306, as compared with the first and second embodiments. With the first and second embodiments, when the service provider PRV updates the version of the configuration data 306 posted on the server 300, the version update is not reflected in the tester hardware 100 before the user again executes Step S204 (S300).

In contrast, with the third embodiment, when the version of the configuration data 306 posted on the server 300 is updated, the flow proceeds to the download step, i.e., 5408, thereby automatically updating the configuration data 306 installed on the tester hardware 100.

It should be noted that an arrangement may be made in which, when the storage device 206 has the configuration data 306 selected in Step S406, the control program 302 does not access the configuration data 306 posted on the server 300, and writes the configuration data 306 stored in the storage device 206 to the nonvolatile memory 102 of the tester hardware 100.

After the setup described in the first through third embodiments described above has elapsed, the information processing apparatus 200 is able to execute a test according to the test program 240.

The execution unit 220 controls the tester hardware 100 based on the test program 240 mainly composed of the control program 302 and the test algorithm module 304a. The data obtained as a result of the test is transmitted from the tester hardware 100 to the information processing apparatus 200, and is stored in the storage device 206.

Furthermore, using an analysis method defined by the analysis tool module 304b, the analyzing unit 230 analyzes the data acquired by the tester hardware 100.

The above is the operation of the test system 2. The test system 2 has the following advantages as compared with conventional test apparatuses.

1. With the test system 2, the tester hardware 100 does not have a dedicated configuration limited to a particular device or particular test content. Rather, the test system 2 is designed to have high versatility which allows various kinds of test content to be provided. With such an arrangement, various kinds of configuration data optimized for various kinds of devices to be tested and optimized for various kinds of test content are prepared by the service provider or a third party, and are stored in the server 300.

By selecting the optimum configuration data 306 for the DUT 4 to be tested, and by writing the configuration data 306 thus selected to the nonvolatile memory 102 included in the tester hardware, such an arrangement allows the user USR to appropriately test the DUT 4.

That is to say, with the test system 2, there is no need to prepare a dedicated test apparatus (hardware) for each kind of DUT 4 or each test item, thereby providing a reduced cost for the user.

2. If a new test that has not previously existed is required after a device is newly developed, the configuration data 306 and the program module 304 configured to support the new test content can be provided by the service provider PRV or by a third party. Thus, for devices that are within the range of the processing capacity of the tester hardware, the test system 2 allows the user to test devices from currently developed devices to devices that will be developed in the future.

3. With conventional techniques, before a semiconductor device in the development phase is tested, there is a need to prepare a power supply apparatus, an arbitrary waveform generator, and an oscilloscope or a digitizer, each configured as separate components, and to combine the separate components thus prepared so as to measure desired characteristics of the device. In contrast, with the test system 2 according to the embodiment, by preparing only the information processing apparatus 200 and the tester hardware 100, such an arrangement allows the user to appropriately test various kinds of semiconductor devices in a simple manner.

4. If the tester hardware 100 is used in the development phase, the tester hardware 100 can be designed assuming that the number of devices to be tested at the same time is smaller, i.e., designed with a reduced number of channels. Furthermore, the tester hardware 100 can be designed assuming that it will operate in cooperation with the information processing apparatus. Moreover, the tester hardware 100 can be designed with a part of the functions omitted as necessary. This allows the tester hardware 100 to be configured with a low cost and with a very compact size, as compared with conventional test apparatuses for the mass production phase. Specifically, this allows the tester hardware 100 to be configured with a desktop size or a portable size.

From the viewpoint of the user USR, such an arrangement allows each researcher or each developer or otherwise each researcher/developer group to personally possesses the tester hardware 100. From the viewpoint of the service provider PRV, such an arrangement allows the tester hardware 100 to become popular, thereby expanding its business.

5. Conventional test apparatuses have a large size, which in practice does not allow the user to move such a large-size test apparatus. Instead, the user must move the DUT 4 to the conventional test apparatus. In contrast, with the tester hardware 100 configured to have a reduced size, such an arrangement allows the user to move the tester hardware 100 to the location of the device under test.

For example, let us consider a case in which the user desires to test a device under test in a clean room. In a case in which there is a long distance between the position at which the test apparatus is installed and the device under test, moving the device over a long distance is undesirable giving consideration to device contamination even if the device is transferred in a clean room. That is to say, with conventional techniques, in some cases, neither the device under test nor the test apparatus can be moved, which is a problem. Thus, in some cases, the usage of the test apparatus is limited. In contrast, the test system 2 according to the embodiment can be installed in various positions in a clean room. Also, such a test system 2 can be brought into the clean room, and can be taken out from the clean room. Also, such an arrangement allows the user to perform a test in a special environment outdoors. That is to say, such an arrangement dramatically extends the conditions in which the test apparatus can be used, as compared with conventional techniques.

6. With the test system 2, the service provider PRV prepares various kinds of program modules 304 on the server 300 configured as a cloud system. Such an arrangement allows the user USR to select a suitable one from among the program modules 304 thus prepared according to the kind of semiconductor device, the test items, and the evaluation algorithm, and to embed the program module 304 thus selected in the test program 240. As a result, such an arrangement allows the user USR to appropriately test a device without a need to develop a test program, unlike conventional techniques.

7. Description has been made in the embodiments regarding an arrangement in which the configuration data 306 is written to the nonvolatile memory 102 of the tester hardware 100, thereby allowing at least a part of the functions of the tester hardware 100 to be changed. However, the present invention is not restricted to such an arrangement. There are known FPGAs employing volatile memory instead of nonvolatile memory, and configured to rewrite the volatile memory so as to change the functions to be provided. In a case in which such an FPGA is employed, such an arrangement allows the functions of the tester hardware 100 to be changed according to the data stored in the volatile memory such as SRAM, DRAM or the like mounted on the tester hardware 100.

The volatile memory has a writing rate that is dramatically higher than that of the nonvolatile memory. Thus, such an arrangement employing the volatile memory provides dramatically reduced user wait time when the user changes the functions of the tester hardware 100. It should be noted that, in a case in which such volatile memory is employed, there is a need to write the configuration data to the volatile memory every time the tester hardware 100 starts up. However, the configuration data is written to the volatile memory at a sufficiently high rate. Thus, the waiting time imparts negligible stress to the user.

While the preferred embodiments of the present invention have been described using specific terms, such description is for illustrative purposes only, and it is to be understood that changes and variations may be made without departing from the spirit or scope of the appended claims.

What is claimed is:

1. A test system configured to test a semiconductor device under test, the test system comprising:
   a server configured to store a plurality of configuration data which allow the test system to have different functions, wherein the server is managed by a service provider;
   a tester hardware configured to test the semiconductor device under test, wherein the tester hardware comprises memory that stores the configuration data and a programmable device that changes its configuration according to the configuration data stored in the memory such that at least a part of functions of the tester hardware changes, and wherein the tester hardware is provided to a user by the service provider and is used by the user; and
   an information processing apparatus connected to the server via a network and configured to access the server, wherein the information processing apparatus is used by the user and a control program provided by the service provider is installed on the information processing apparatus,
   wherein the information processing apparatus is further configured to transmit/receive data to/from the tester hardware, and
   wherein the control program provides (i) a function of displaying, on a display, a plurality of configuration data candidates, and (ii) a function of writing the configuration data selected by the user to the memory of the tester hardware.

2. The test system according to claim 1, wherein the plurality of configuration data are downloaded beforehand to the information processing apparatus before the setup operation is performed.

3. The test system according to claim 2, wherein the control program displays, as a candidate, the configuration data that has already been downloaded.

4. The test system according to claim 1, wherein the plurality of configuration data are stored in the server as a file that is separate from the control program.

5. The test system according to claim 4, wherein the plurality of configuration data are stored in the server in the form of a single file package.

6. The test system according to claim 1, wherein the plurality of configuration data are included in the control program.

7. The test system according to claim 1, wherein the control program further provides the information processing apparatus with (iii) a function of downloading the configuration data selected by the user from the server.

8. The test system according to claim 1, wherein the server stores a plurality of program modules in order to provide the test system with different functions, in addition to the plurality of configuration data,
and wherein at least one from among the information processing apparatus and the server holds license information with respect to whether or not usage by the information processing apparatus is allowed for each of the program modules,
and wherein, when a given program module is executed in a case in which the information processing apparatus has a license to use the program module and the configuration data that corresponds to the program module has been installed on the tester hardware, the information processing apparatus is able to perform a test operation.

9. A control program to be executed in an information processing apparatus that forms, together with a server and a tester hardware, a test system configured to test a semiconductor device under test, wherein the server is connected to the information processing apparatus via a network, and stores a plurality of configuration data which allow the test system to have different functions, and the server is managed by a service provider,
the tester hardware comprises memory that stores the configuration data and a programmable device that changes its configuration according to the configuration data stored in the memory such that at least a part of functions of the tester hardware changes, and the tester hardware is provided to a user by the service provider and is used by the user,
wherein the information processing apparatus is configured to access the server, and the information processing apparatus is further configured to transmit/receive data to/from the tester hardware, and
wherein the control program provides the information processing apparatus with (i) a function of displaying, on a display, a plurality of configuration data candidates, and (ii) a function of writing the configuration data selected by the user to the memory of the tester hardware, and wherein the control program is provided by the service provider.

10. The test system according to claim 9, wherein the control program displays, as a candidate, the configuration data that has already been downloaded.

11. The test system according to claim 9, wherein the plurality of configuration data are stored in the server as a file that is separate from the control program.

12. The test system according to claim 9, wherein the plurality of configuration data are included in the control program.

13. The test system according to claim 9, wherein the control program further provides the information processing apparatus with (iii) a function of downloading the configuration data selected by the user from the server.

14. The control program according to claim 9, wherein the server stores a plurality of program modules which allow the test system to have different functions, in addition to the plurality of configuration data,
and wherein at least one from among the information processing apparatus and the server holds license information with respect to whether or not usage by the information processing apparatus is allowed for each of the program modules,
and wherein, (iv) when a given program module is executed in a case in which the information processing apparatus has a license to use the program module and the configuration data that corresponds to the program module has been installed on the tester hardware, the test apparatus is able to operate.

15. A method for writing configuration data to a tester hardware in a test system comprising a server managed by a service provider, the tester hardware provided by the service provider and used by a user, and an information processing apparatus used by the user, wherein the server is connected to the information processing apparatus via a network,
and wherein the tester hardware comprises memory that stores the configuration data and a programmable device that changes its configuration according to the configuration data stored in the memory such that at least a part of functions of the tester hardware changes, and the tester hardware supplies a power supply voltage to a semiconductor device under test, transmits a signal to the semiconductor device under test, and receives a signal from the semiconductor device under test, and
wherein the information processing apparatus is configured to access the server, and the information processing apparatus is further configured to transmit/receive data to/from the tester hardware, and
wherein the method comprises:
storing, in the server, a plurality of configuration data which allow the test system to have different functions;
displaying, by the information processing apparatus, on a display, a plurality of configuration data candidates;
inputting, to the information processing apparatus, the selection of the configuration data from the user; and
writing, by the information processing apparatus, the configuration data selected by the user to the memory of the tester hardware.

* * * * *